US012792571B2

(12) United States Patent
Chawla et al.

(10) Patent No.: US 12,792,571 B2
(45) **Date of Patent: *Nov. 10, 2026**

(54) RETRIEVAL-ACCESS GENERATION INGESTION VERSIONING

(71) Applicant: Dell Products L.P., Round Rock, TX (US)

(72) Inventors: Gaurav Chawla, Austin, TX (US); Adam E. Brenner, Mission Viejo, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/946,737

(22) Filed: Nov. 13, 2024

(65) Prior Publication Data

US 2026/0133942 A1 May 14, 2026

(51) Int. Cl.
*G06F 16/18* (2019.01)
*G06F 16/13* (2019.01)
*G06F 16/14* (2019.01)

(52) U.S. Cl.
CPC .......... *G06F 16/1873* (2019.01); *G06F 16/13* (2019.01); *G06F 16/156* (2019.01)

(58) Field of Classification Search
CPC ..... G06F 16/1873; G06F 16/13; G06F 16/156
See application file for complete search history.

(56) References Cited

U.S. PATENT DOCUMENTS 9,336,092 B1 5/2016 Li
10,725,993 B1 * 7/2020 Sivasubramanian ........................ G06F 16/2272
11,194,792 B2 12/2021 Lu
12,020,140 B1 6/2024 Mondlock
12,079,570 B1 9/2024 Mondlock
12,135,740 B1 11/2024 Yu
12,164,664 B1 12/2024 Dupont
12,204,565 B1 1/2025 Yu
(Continued)

OTHER PUBLICATIONS

Zhao et al. Retrieval-Augmented Generation for AI-Generated Content: A Survey. arXiv:2402.19473v6, Jun. 2024. pp. 1-22. (Year: 2024).*

Designing a System to Store Both Files and Objects. Aug. 2024, pp. 1-8. https://blog.purestorage.com/products/designing-a-system-to-store-both-files-and-objects/. (Year: 2024).*

(Continued)

*Primary Examiner* — Mohammad S Rostami

(74) *Attorney, Agent, or Firm* — Amin, Turocy & Watson, LLP

(57) ABSTRACT

A system can execute a search system that stores respective metadata of respective data from the storage system, wherein the respective metadata comprises respective first generation identifiers that indicate respective updates to the respective data. The system can maintain a checkpoint that comprises pairs, respective pairs of the pairs comprising identifications of at least some of the respective data stored in the storage system and respective second generation identifiers that correspond to the respective data. The system can, as part of an iteration of ingesting data from the storage system, query the search system to identify a first portion of the data having respective third generation identifiers that are greater than the respective second generation identifiers in the checkpoint, and ingest the first portion of the data into a retrieval-augmented generation system while refraining from ingesting a second portion of the data.

20 Claims, 11 Drawing Sheets

(56) References Cited

U.S. PATENT DOCUMENTS

| | | | |
|---|---|---|---|
| 12,235,882 | B1 | 2/2025 | Chawla |
| 12,277,409 | B1 | 4/2025 | Leeman-Munk |
| 12,401,743 | B1 | 8/2025 | Paliwal |
| 2015/0234710 | A1 | 8/2015 | Berrington |
| 2018/0246950 | A1 | 8/2018 | Arye |
| 2020/0334254 | A1 | 10/2020 | Arye |
| 2024/0046318 | A1 | 2/2024 | Muriqi |
| 2024/0111498 | A1 | 4/2024 | Vaughn |
| 2024/0256592 | A1 | 8/2024 | O'Neill |
| 2024/0256678 | A1 | 8/2024 | Thompson |
| 2024/0311342 | A1 | 9/2024 | Shankar |
| 2024/0362208 | A1 | 10/2024 | Naufel |
| 2024/0380802 | A1 | 11/2024 | Gill |
| 2024/0386015 | A1 | 11/2024 | Crabtree |
| 2024/0394965 | A1 | 11/2024 | Doggett |
| 2024/0411528 | A1 | 12/2024 | Ziolkowski |
| 2024/0412720 | A1 | 12/2024 | Vasylyev |
| 2024/0419830 | A1 | 12/2024 | Park |
| 2025/0094400 | A1 | 3/2025 | Mishra |
| 2025/0117412 | A1 | 4/2025 | Jalagam |
| 2025/0190802 | A1 | 6/2025 | Kar |
| 2025/0209312 | A1 | 6/2025 | Crabtree |
| 2025/0245218 | A1 | 7/2025 | Longoni |
| 2025/0252359 | A1 | 8/2025 | Pesala |
| 2025/0265071 | A1 | 8/2025 | Ananthesweran |

OTHER PUBLICATIONS

Hosea et al. Transforming Data Warehouses into Dynamic Knowledge Bases for RAG. Scientific Research Journal of Science, Engineering and Technology 2:1, 2024, pp. 5-10. (Year: 2024).*

Shi et al. Enhancing Retrieval and Managing Retrieval: A Four-Module Synergy for Improved Quality and Efficiency in RAG Systems. arXiv:2407.10670v1, Jul. 2024, pp. 1-9. (Year: 2024).*

Chawla, et al. "Multi-Tenancy Retrieval-Access Generation Ingestion Versioning" U.S. Appl. No. 18/946,756, filed Nov. 13, 2024, 47 pages.

Office Action mailed Aug. 12, 2025 for U.S. Appl. No. 18/946,756, 41 pages.

Notice of Allowance mailed Dec. 16, 2025 for U.S. Appl. No. 18/946,756, 32 pages.

Chawla, et al. "Deduplication in Retrieval-Access Generation Ingestion Versioning" U.S. Appl. No. 18/946,762, filed Nov. 13, 2024, 53 pages.

Chawla, et al. "Updates and Deletes in Retrieval-Access Generation Ingestion Versioning" U.S. Appl. No. 18/946,770, filed Nov. 13, 2024, 52 pages.

Office Action mailed Sep. 9, 2025 for U.S. Appl. No. 18/946,770, 50 pages.

Notice of Allowance mailed Oct. 16, 2025 for U.S. Appl. No. 18/946,762, 36 pages.

Notice of Allowance mailed Jan. 22, 2026 for U.S. Appl. No. 18/946,770, 50 pages.

* cited by examiner

400

```
{
        "folder paths": [
                {
                        "path": "/johndoe/data",
                        "generation": 42
                },
                {
                        "path": "/janedoe",
                        "generation": 24
                }
        ]
}
```

FIG. 4

RETRIEVAL-ACCESS GENERATION INGESTION VERSIONING

RELATED APPLICATIONS

The subject patent application is related by subject matter to, U.S. patent application Ser. No. 18/946,756, filed Nov. 13, 2024 and entitled "MULTI-TENANCY RETRIEVAL-ACCESS GENERATION INGESTION VERSIONING," the entirety of which application is hereby incorporated by reference herein.

BACKGROUND

A retrieval-access generation (RAG) system can generally comprise a large language model (LLM) that operates on a specific information set (e.g., a set of documents) so that the LLM is configured to respond to queries based on that information set. A LLM can generally comprise a form of generative artificial intelligence (AI) that is configured to generative natural-language response outputs to natural-language query inputs.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can execute a retrieval-augmented generation process for a retrieval-augmented generation system, wherein the retrieval-augmented generation process is configured to ingest data from a storage system and to send the data to be ingested by the retrieval-augmented generation system via a communications protocol that omits tracking of previously-ingested data. The system can execute a search system that stores respective metadata of respective data from the storage system, wherein the respective metadata comprises respective first generation identifiers that indicate respective updates to the respective data. The system can maintain a checkpoint that comprises pairs, respective pairs of the pairs comprising identifications of at least some of the respective data stored in the storage system and respective second generation identifiers that correspond to the respective data. The system can, based on executing the retrieval-augmented generation process comprising performance of an iteration of ingesting data from the storage system, query the search system to identify a first portion of the data having respective third generation identifiers that are greater than the respective second generation identifiers in the checkpoint, ingest the first portion of the data into the retrieval-augmented generation system while refraining from ingesting a second portion of the data having respective fourth generation identifiers that are less than or equal to the respective second generation identifiers in the checkpoint, and service queries to the retrieval-augmented generation system based on the ingesting of the first portion of the data.

An example method can comprise enabling, by a system comprising at least one processor, a search system that stores respective metadata of respective data from a storage system, wherein the respective metadata comprises corresponding first generation identifiers that indicate respective updates to the respective data, wherein a checkpoint is maintained by the system that comprises pairs, and wherein respective pairs of the pairs comprise identifications of at least some of the respective data stored in the storage system and corresponding second generation identifiers that correspond to the respective data. The method can further comprise, based on a retrieval-augmented generation process performing an iteration of ingesting data from the storage system, wherein the retrieval-augmented generation process is configured to ingest the data from the storage system and to a retrieval-augmented generation system via a communications protocol that omits tracking of previously-ingested data, querying, by the system, the search system to identify a portion of the data with corresponding third generation identifiers that are greater than the corresponding second generation identifiers in the checkpoint, ingesting, by the system, the portion of the data into the retrieval-augmented generation system while refraining from ingesting any portions of the data with corresponding fourth generation identifiers that are less than or equal to the corresponding second generation identifiers in the checkpoint, and servicing, by the system, queries to the retrieval-augmented generation system based on the ingesting of the portion of the data.

An example non-transitory computer-readable medium can comprise instructions that, in response to execution, cause a system comprising a processor to perform operations. These operations can comprise maintaining a state file that comprises pairs, respective pairs of the pairs comprising identifications of at least some of the respective data stored in a storage system and respective second generation identifiers that correspond to the respective data. These operations can further comprise, based on a retrieval-augmented generation framework performing an iteration of ingesting data from the storage system, wherein the retrieval-augmented generation framework is configured to ingest the data from the storage system and to a retrieval-augmented generation system via a communications protocol that omits tracking of previously-ingested data, querying a search system to identify at least one first portion of the data that has at least one respective third generation identifier that is greater than the respective second generation identifiers in the state file, wherein the search system stores respective metadata of respective data from the storage system, wherein the respective metadata comprises respective first generation identifiers that indicate respective updates to the respective data, ingesting the at least one first portion of the data into the retrieval-augmented generation system while refraining from ingesting at least one second portion of the data that has at least one respective fourth generation identifier that is less than or equal to the respective second generation identifiers in the state file, and servicing queries to the retrieval-augmented generation system based on the ingesting of the at least one first portion of the data.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates an example state file that can facilitate RAG ingestion versioning, in accordance with an embodiment of this disclosure;

DETAILED DESCRIPTION

Overview

Figure 1:
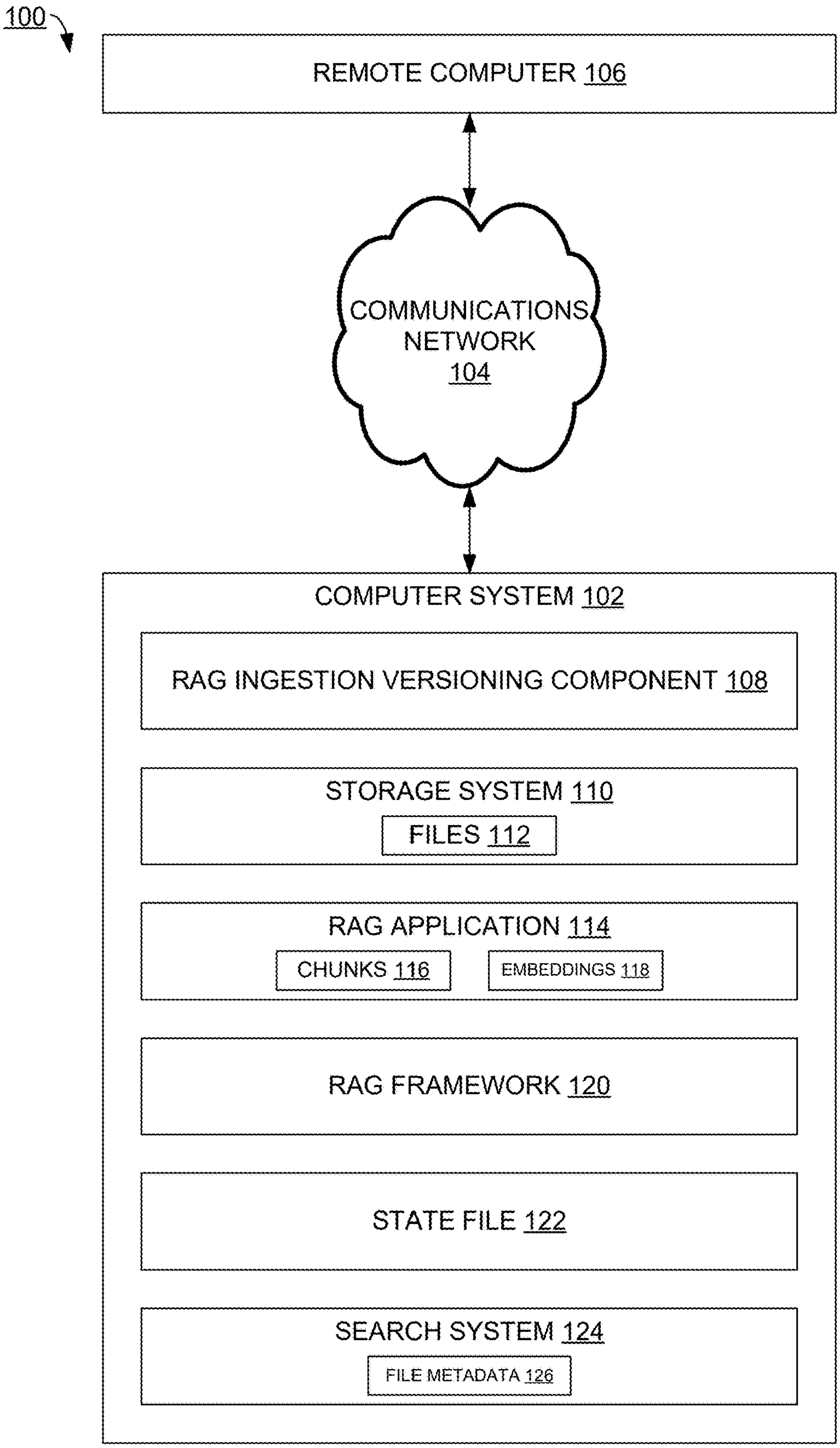
FIG. 1 illustrates an example system architecture that can facilitate RAG ingestion versioning, in accordance with an embodiment of this disclosure.

In computer storage systems, there can be metadata index management. Metadata index management can comprise periodically exporting file system metadata from the computer storage system to a remote computer endpoint that can facilitate searching on that data.

It can be that metadata index management utilizes file backup snapshots (and an application programming interface (API) that facilitates determining differences between two snapshots).

The present techniques can implement metadata index management with artificial intelligence (AI) retrieval-augmented generation (RAG) systems to extend functionality, features, and integrations in accessing information about the files on a computer storage system.

A RAG framework can generally comprise a component that can read from source data and ingest it into a RAG application. There can be AI RAG frameworks that can read data from a computer storage system via various protocols (e.g., an object storage protocol or a network file storage (NFS) protocol. However, it can be that these frameworks do not keep track of which files were previously read, so do not perform detection of file changes.

A result can be a RAG framework that treats all data as brand new, regardless of whether 1 file or 1 billion files have changed. This can result in the RAG framework taking more time to process file changes, and consuming more compute and storage resources for a data ingestion process, compared with an implementation that does track file changes.

While it can be that prior protocols to read data from a computer storage system lack a mechanism to detect file changes, the computer storage system itself can track file changes.

The present techniques can be implemented to utilize metadata index management to create a document loader to a RAG framework that tracks which files have been processed and read by the RAG framework. When a RAG framework is re-run to ingest new data, the document loader can skip sending files that have already been processed, and instead send only those files that have not been processed by the RAG framework.

The present techniques can facilitate a reduction in time spent on re-ingesting data with a RAG framework, as well as a reduction in network, compute, and storage usage. This can enable data scientists to run a data processing workflow frequently, and enable use of this to trigger automated processing of changed files to create a real-time RAG.

It can be challenging for a person to determine which files have changed on a large system. Computer storage systems can store billions of files. Additionally, it can be that RAG frameworks lack an ability to track these files as the protocols they use (e.g., NFS) do not offer this feature.

The present techniques can be implemented with a connector for a RAG framework, which can be integrated with a computer storage system metadata index management feature.

What follows is a sample workflow according to the present techniques:

1. A computer storage system with metadata index management can be installed and configured to send results on a periodic bases to a remote search server.
2. A developer (e.g., a data scientist) can develop a RAG application using a RAG framework.
3. The developer can download and install a document loader for RAG framework according to the present techniques.
4. The developer can provide a hostname, credentials and path on a computer storage system to ingest data to the RAG framework and data loader (e.g., class arguments to the document loader). In some RAG frameworks, a document loader can comprise a plugin (e.g., a separate programming language class) that can be optionally used. Where the document loader comprises a class, the class arguments can comprise options and/or parameters (e.g., hostname, credentials, etc.).
5. The developer can run the RAG framework with the document loader.
6. The document loader can do the following:
   - (A) Receive a hostname, credentials and path as input parameters, and verify that they are correct. There can be a fail where it is determined that the input parameters are not valid.
   - (B) Read a state file maintained by the document loader and determine if the provided path was previously run.
     - I. If the state file does not exist, or the path was never previously run, continue to step 6(D).
     - II. If the state file exists and path was previously run, continue to step 6(C).
     - III. A state file can comprise a list of computer storage system paths, along with a generation identifier (ID). The generation ID can comprise an incremental number that is updated each time a new entry is added, or an existing entry is updated in the database. It can be that a state file does not contain duplicate entries for the same path, and one state file is created per metadata index management instance.

(C) Issue a search system scroll query to find all entries that have a generation ID that is greater than the one from the previous one. Pass the list of files to step 5.

(D) Pass the list of files or list of directories (paths) asynchronously to an existing RAG framework that processes data. In some examples, this can be done by chunking, embedding, etc.

Update the state file to record a highest generation ID document loader processed from step 6(D).

It can be that a data connector (used to ingest data into a RAG application) is not designed for multi-tenancy, as all instances write to a single state record. Where two or more RAG applications connect to the same metadata index management search system instance, there can be a risk that the applications could overwrite each other while writing to the same record. For example, the two applications could be processing the same files for different use cases.

A result can be that RAG applications that utilize a data connector could skip files when they should have been processed, but were not, because another application instance processed the files and marked them as completed.

Another problem can be that a single RAG application can have multiple versions, in which case, each version can be treated as a separate instance. This can occur when a new version of an application is released for testing with a limited set of users before a full production release. It can be that different versions are exploring different data processing strategies for the same set of files.

A solution to address these problems, according to the present techniques, can involve a data connector writing a unique state file per RAG application instance. Each state file can contain the RAG application name and version of that RAG application. This can solve the problems identified with a multi-tenancy scenario for a data connector.

That is, multiple RAG applications can read and update their own state file independently of each other. Additionally, different versions of the RAG application can keep track of their own processed files regardless of other versions.

It can be that handling multi-tenancy scenarios and versioning scenarios can be a nontrivial issue, and can be complex to solve. The present techniques can facilitate a data connector in creating a unique instance per RAG application, and also filter between different versions of the same RAG application.

What follows is a sample workflow according to the present techniques:

1. Two parameters can be added to a data connector: application name and application version.
2. When the data connector is called, it can check to see if a state file with the unique application name exists.
   - (A) If it does exist, the data connector can check to see if the provided path on a computer storage system exists that matches the same application version provided in step 1. If an entry exists, step 3 is performed.
   - (B) If no entry exists in the state file, step 4 is performed
3. Issue a search server scroll query to find all entries that have a generation ID that is greater than the one from the previous ingestion for that RAG application/version. Pass the list of files to step 5.
4. Pass the list of files or list of directories (paths) asynchronously to existing an RAG framework that processes data. In some examples, this can be done with chunking, embedding, etc.
5. Update the state file to record the highest generation ID that the document loader processed from step 4 for the specific application and version number.

Example Architectures, Etc.

FIG. 1 illustrates an example system architecture 100 that can facilitate RAG ingestion versioning, in accordance with an embodiment of this disclosure.

System architecture 100 comprises computer system 102, communications network 104, and remote computer 106. In turn, computer system 102 comprises RAG ingestion versioning component 108, storage system 110 (which comprises files 112), RAG application 114 (which comprises chunks 116 and embeddings 118), RAG framework 120, state file 122, and search system 124 (which comprises file metadata 126).

Figure 11:
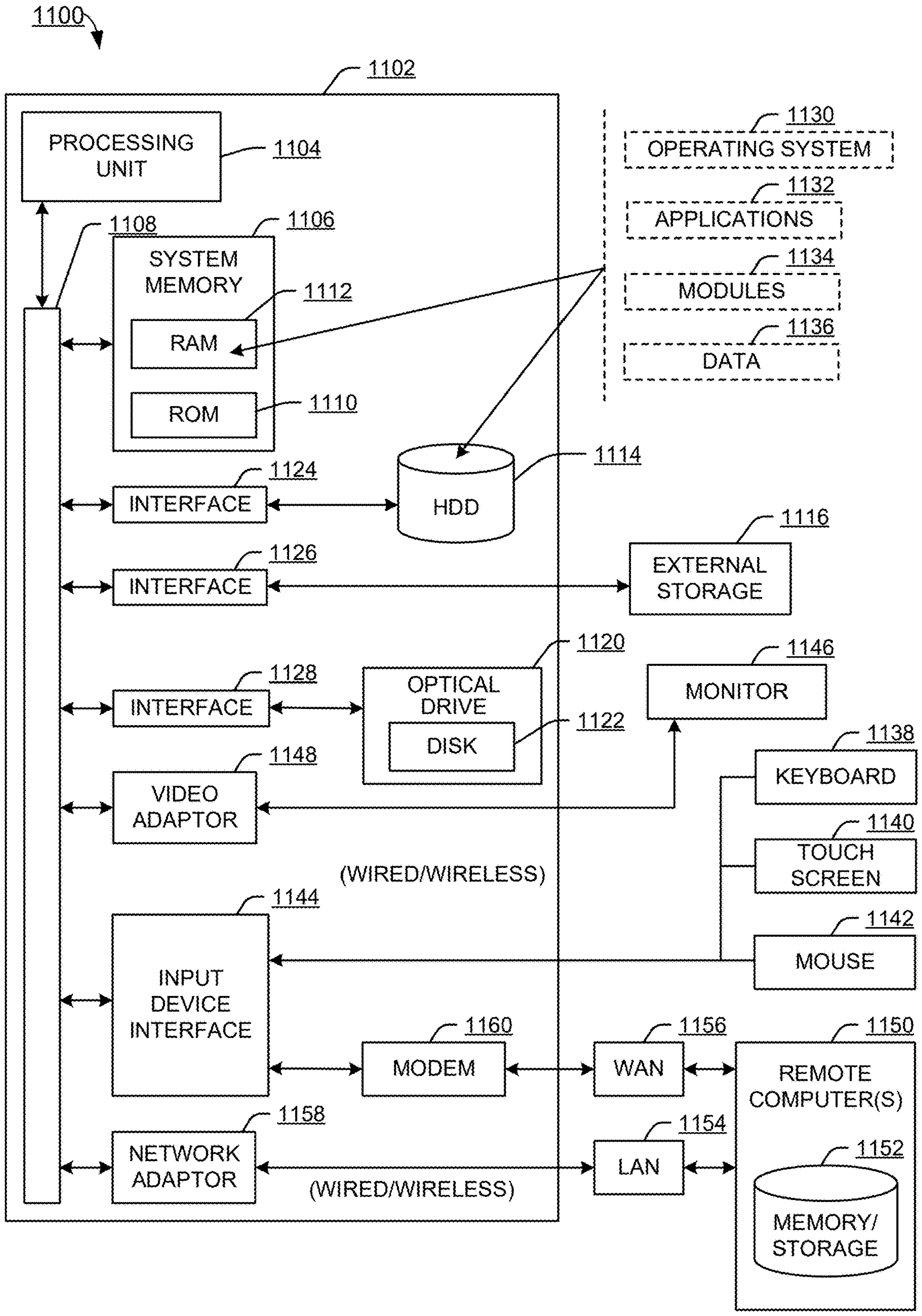
FIG. 11 illustrates an example block diagram of a computer operable to execute an embodiment of this disclosure.

Each of computer system 102 and/or remote computer 106 can be implemented with part(s) of computing environment 1100 of FIG. 11. Communications network 104 can comprise a computer communications network, such as the Internet, or an isolated private computer communications network.

RAG application 114 can respond to queries based on information in files 112 stored in storage system 110. RAG application can store information in files 112 as chunks 116 (where a file can comprise multiple chunks) and embeddings 118 (where an embedding can comprise a numerical vector representation of a chunk, and wherein a similarity search between a vector representation of a query and the embeddings can be performed as part of a RAG application responding to the query).

RAG framework 120 (in conjunction with RAG ingestion versioning component 108) can ingest files 112 into RAG application 114. That is, RAG framework can copy the data of files 112 to RAG application 114, including creating chunks and embeddings from files 112. In doing so, RAG framework 120 can perform versioning on the files so that only new or updated files are ingested, which can save on bandwidth and processing resources in ingesting data.

To do this, RAG framework 120 can maintain state file 122, which can include information about files 112 and a most-recent version (e.g., a generation ID) that has been ingested into RAG application 114. When performing an ingestion, RAG framework 120 can access search system 124, which can store indexed (that is, more easily searchable than unindexed data) metadata for files 112 as file metadata 126 (where storage system 110 does not index file metadata). RAG framework 120 can use file metadata 126 to determine which files have been updated since a last ingest, and ingest only those files from files 112.

In some examples, RAG ingestion versioning component 108 can perform this identification of new/updated files, and pass a list of those files to RAG framework 120 for ingesting.

With ingested data, RAG application 114 can respond to queries that remote computer 106 makes to it via communications network 104.

In some examples, storage system 110 can, on a regular interval, transfer all new/modified metadata into search system 124. Each time this occurs, a generation ID for that new/modified metadata can be incremented. A query can be performed on search system 124 for entries that are larger than a generation ID identified in state file, and the returned entries (files and/or paths) can be returned to RAG framework 120.

In some examples, RAG ingestion versioning component 108 can implement part(s) of the process flows of FIGS. 5-10 to facilitate RAG ingestion versioning.

It can be appreciated that system architecture 100 is one example system architecture for RAG ingestion versioning, and that there can be other system architectures that facilitate RAG ingestion versioning.

Figure 2:
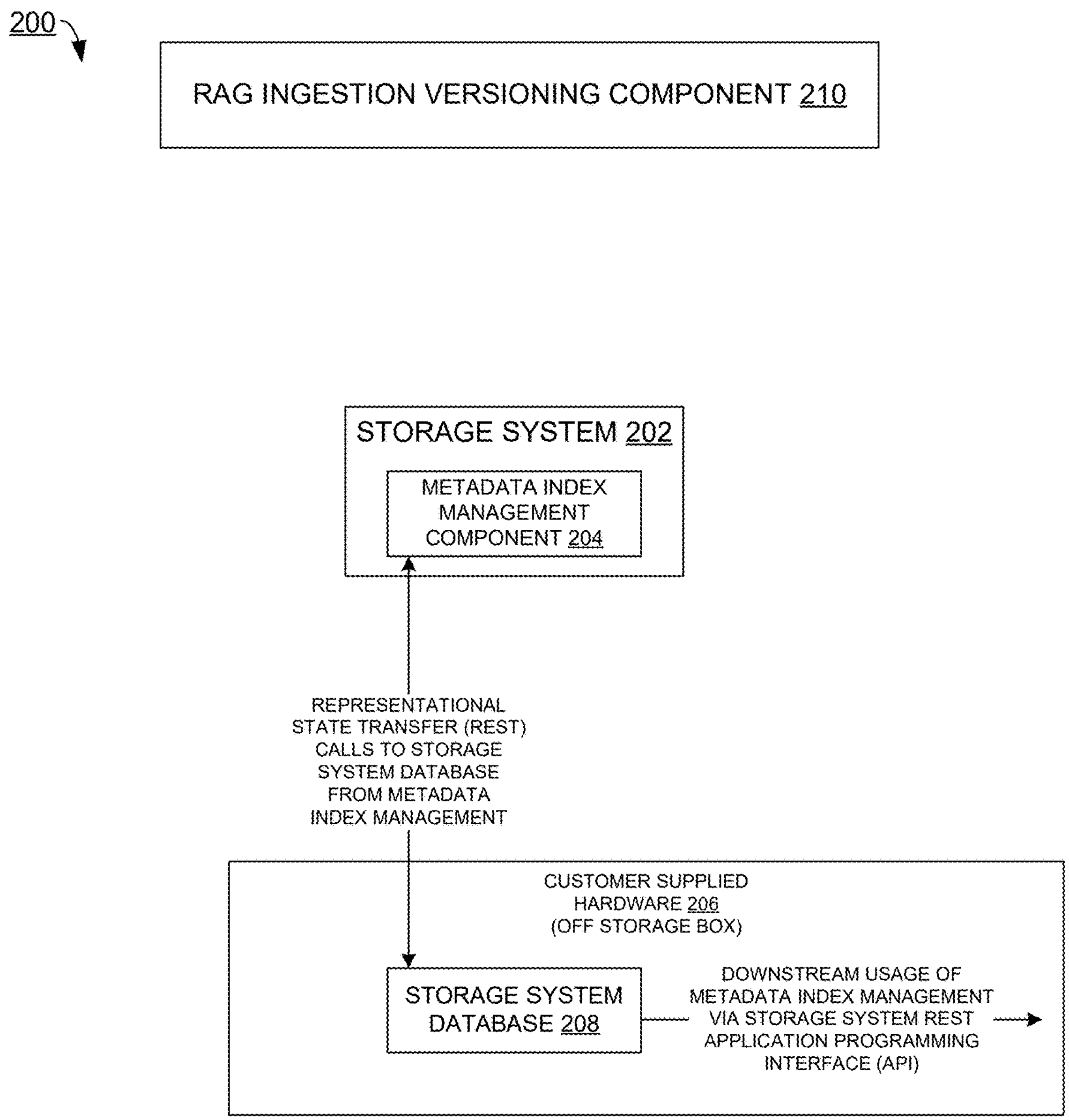
FIG. 2 illustrates another example system architecture that can facilitate RAG ingestion versioning, in accordance with an embodiment of this disclosure.

FIG. 2 illustrates another example system architecture 200 that can facilitate RAG ingestion versioning, in accordance with an embodiment of this disclosure. In some examples, part(s) of system architecture 200 can be implemented by part(s) of system architecture 100 to facilitate RAG ingestion versioning.

System architecture 200 comprises storage system 202, metadata index management component 204, customer supplied hardware 206 (off storage box), storage system database 208, and RAG ingestion versioning component 210 (which can be similar to RAG ingestion versioning component 108 of FIG. 1).

In system architecture 200, it can be that there is not a facility to implement ingestion versioning, because the protocol used to ingest data does not maintain a state of a previous ingestion. This can be addressed in system architecture 300 of FIG. 3, with the use of state file 320, among other components.

Figure 3:
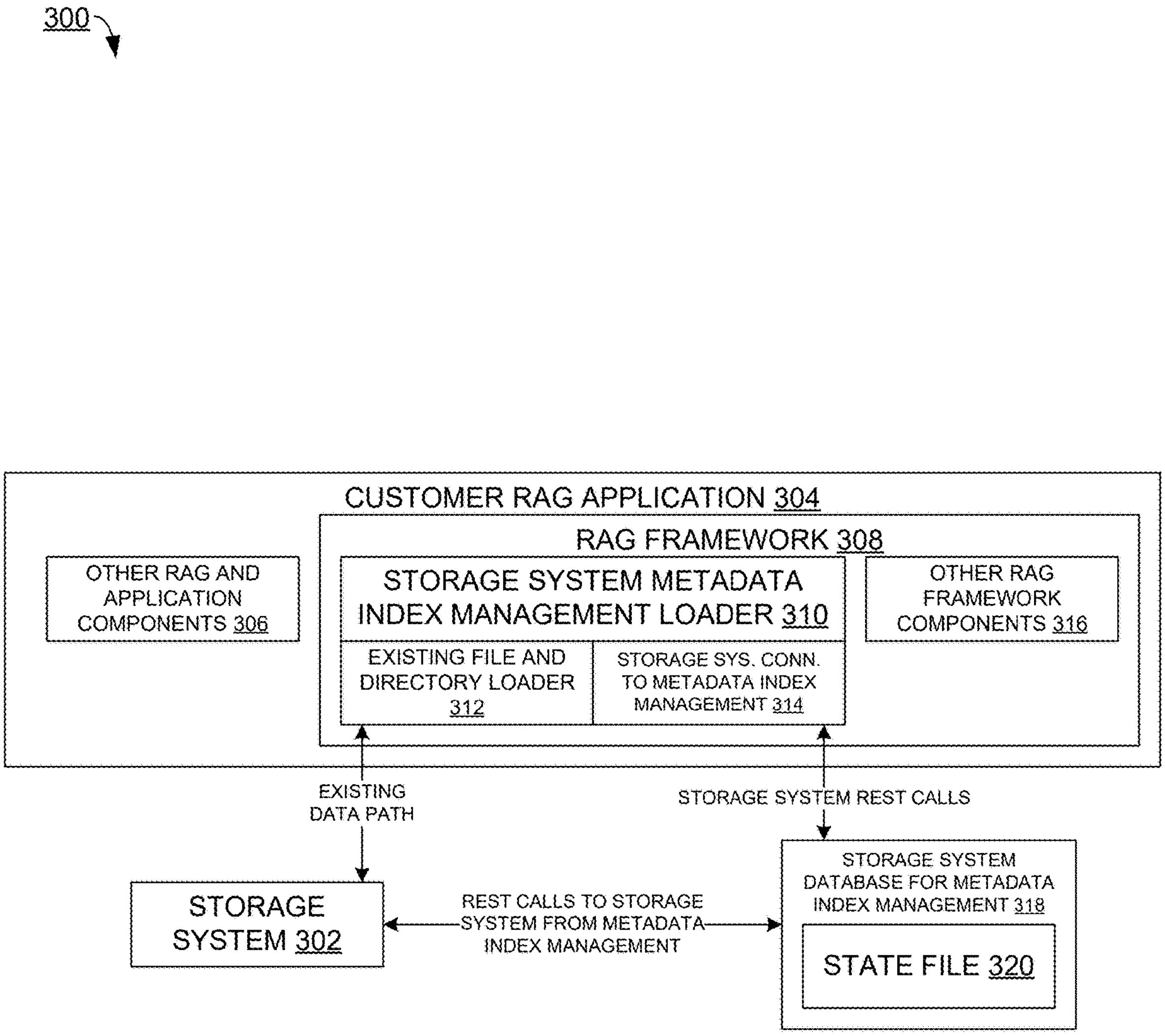
FIG. 3 illustrates another example system architecture that can facilitate RAG ingestion versioning, in accordance with an embodiment of this disclosure.

FIG. 3 illustrates another example system architecture 300 that can facilitate RAG ingestion versioning, in accordance with an embodiment of this disclosure. In some examples, part(s) of system architecture 300 can be implemented by part(s) of system architecture 100 to facilitate RAG ingestion versioning.

System architecture 300 comprises storage system 302, customer RAG application 304, other RAG and application components 306, RAG framework 308, storage system metadata index management loader 310, existing file and directory loader 312, storage system connector to metadata index management 314, other RAG framework components 316, storage system database for metadata index management 318, and state file 320.

FIG. 4 illustrates an example state file 400 that can facilitate RAG ingestion versioning, in accordance with an embodiment of this disclosure. In some examples, part(s) of state file 400 can be implemented by part(s) of system architecture 100 to facilitate RAG ingestion versioning.

State file 400 can be similar to a state file of state files 320 of FIG. 3, and can indicate a last version ("generation") of different files and/or paths that have been ingested into a RAG application. State file 400 can indicate a RAG application that it applies to, with, "State File Record: <unique-application-name>," where "unique-application-name" uniquely identifies a RAG application.

State file 400 can also indicate portions of the state file that apply to different versions of the state file. For example, "path": "/johndoe/data",
"version": 1
"generation": 42 applies to version 1 of unique-application-name, and

"path": "/johndoe/data",
"version": 2
"generation": 56 applies to version 2 of unique-application-name.

Example Process Flows

Figure 5:
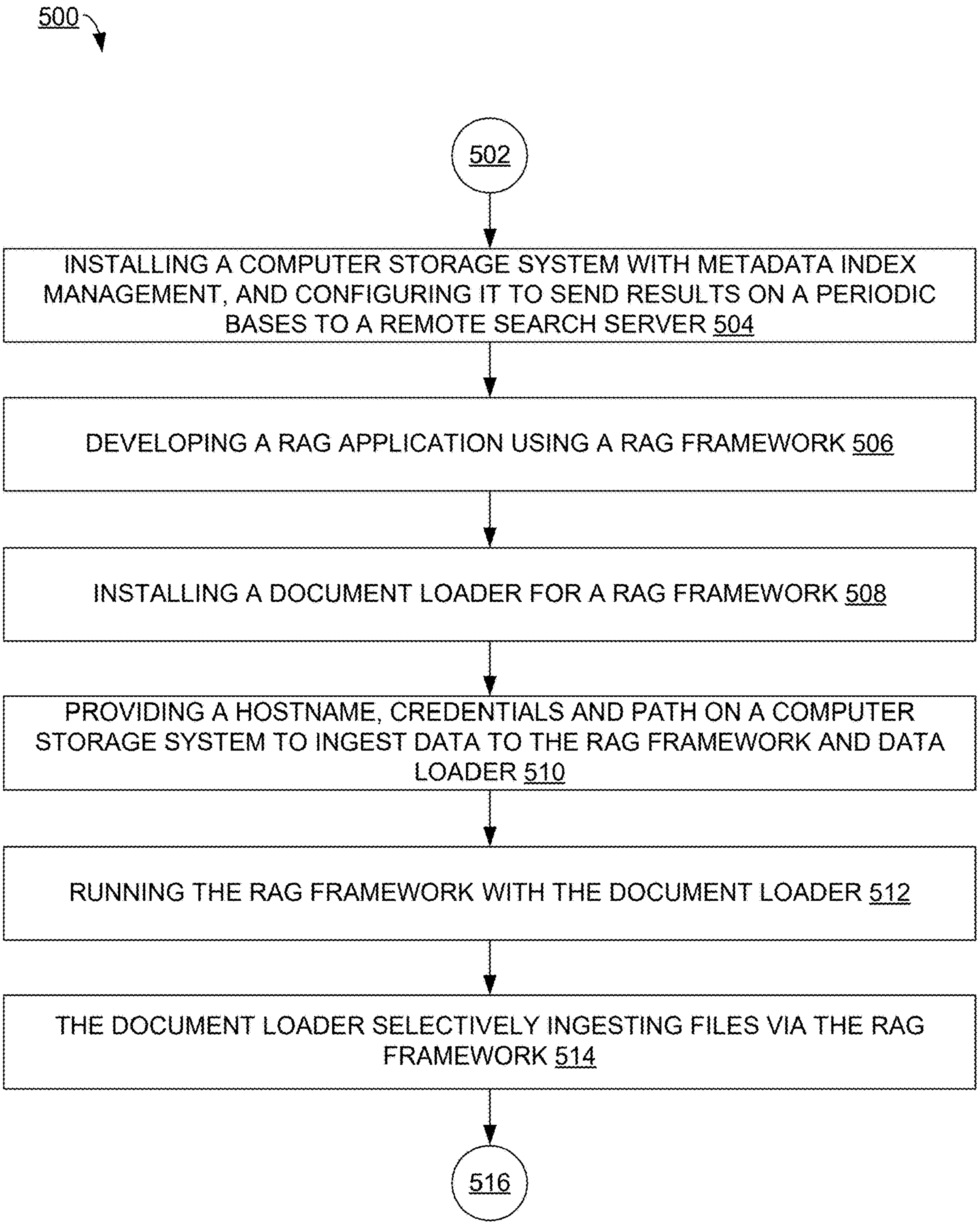
FIG. 5 illustrates an example process flow that can facilitate RAG ingestion versioning, in accordance with an embodiment of this disclosure.

FIG. 5 illustrates an example process flow 500 that can facilitate RAG ingestion versioning, in accordance with an embodiment of this disclosure. In some examples, one or more embodiments of process flow 500 can be implemented by system architecture 100 of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of process flow 600 of FIG. 6, process flow 700 of FIG. 7, process flow 800 of FIG. 8, process flow 900 of FIG. 9, and/or process flow 1000 of FIG. 10.

Process flow 500 begins with 502, and moves to operation 504.

Operation 504 depicts installing a computer storage system with metadata index management, and configuring it to send results on a periodic bases to a remote search server.

After operation 504, process flow 500 moves to operation 506.

Operation 506 depicts developing a RAG application using a RAG framework.

After operation 506, process flow 500 moves to operation 508.

Operation 508 depicts installing a document loader for a RAG framework.

After operation 508, process flow 500 moves to operation 510.

Operation 510 depicts providing a hostname, credentials and path on a computer storage system to ingest data to the RAG framework and data loader (e.g., class arguments to the document loader).

After operation 510, process flow 500 moves to operation 512.

Operation 512 depicts running the RAG framework with the document loader.

After operation 512, process flow 500 moves to operation 514.

Operation 514 depicts the document loader selectively ingesting files via the RAG framework. In some examples, operation 514 can be implemented in a similar manner as process flow 600 of FIG. 6.

After operation 514, process flow 500 moves to 516, where process flow 500 ends.

Figure 6:
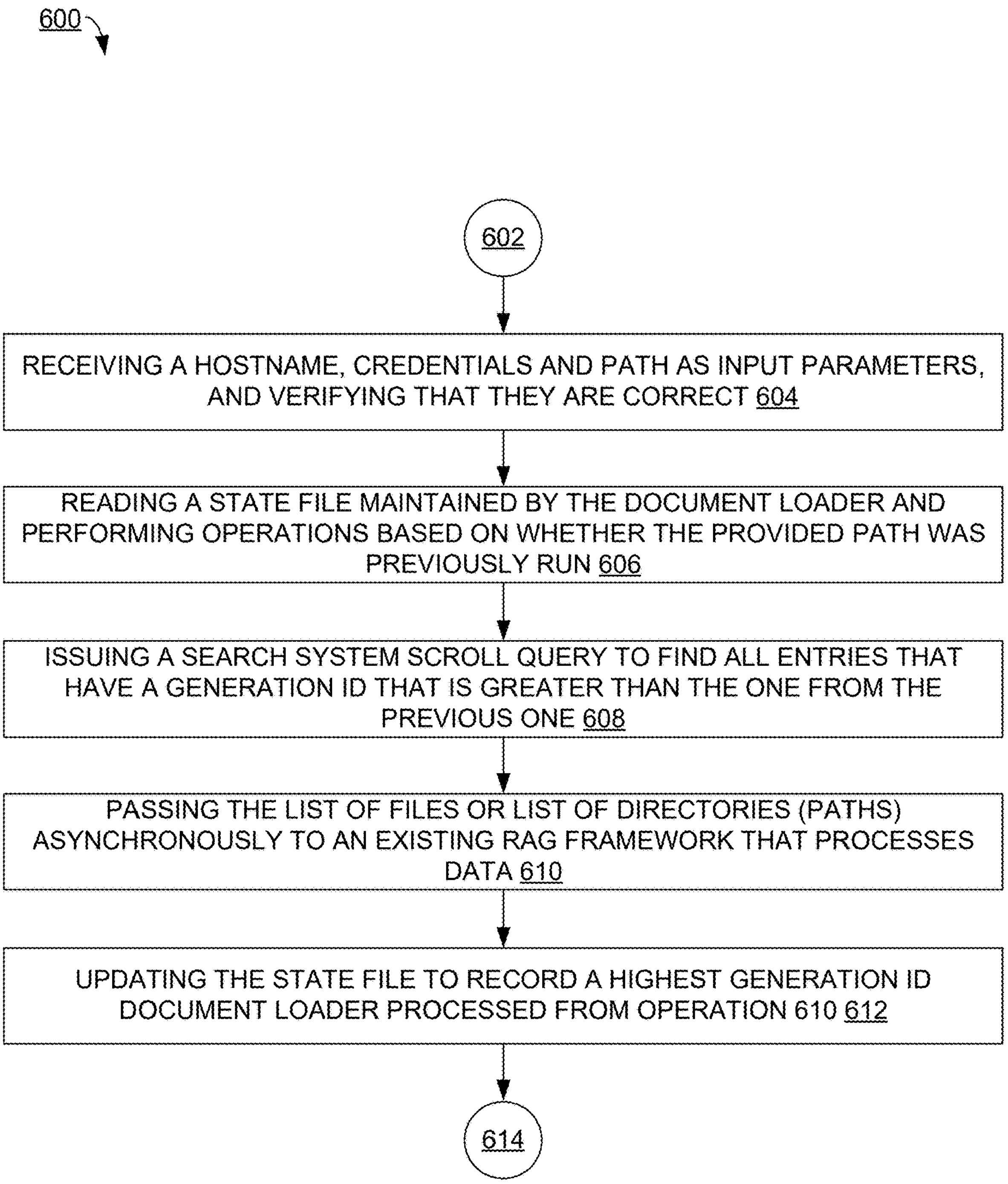
FIG. 6 illustrates another example process flow that can facilitate RAG ingestion versioning, in accordance with an embodiment of this disclosure.

FIG. 6 illustrates another example process flow 600 that can facilitate RAG ingestion versioning, in accordance with an embodiment of this disclosure. In some examples, one or more embodiments of process flow 600 can be implemented by system architecture 100 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of process flow 500 of FIG. 5, process flow 700 of FIG. 7, process flow 800 of FIG. 8, process flow 900 of FIG. 9, and/or process flow 1000 of FIG. 10.

In some examples, process flow 600 can be implemented as part of operation 514 of FIG. 5 to facilitate selectively ingesting files via the RAG framework.

Process flow 600 begins with 602, and moves to operation 604.

Operation 604 depicts receiving a hostname, credentials and path as input parameters, and verifying that they are correct. There can be a fail where it is determined that the input parameters are not valid.

After operation 604, process flow 600 moves to operation 606.

Operation 606 depicts reading a state file maintained by the document loader and performing operations based on whether the provided path was previously run. In some examples, these operations can be similar to those of process flow 700 of FIG. 7.

After operation 606, process flow 600 moves to operation 608.

Operation 608 depicts issuing a search system scroll query to find all entries that have a generation ID that is greater than the one from the previous one. This list of files can be passed to a RAG framework, such as in operation 512 of FIG. 5.

After operation 608, process flow 600 moves to operation 610.

Operation 610 depicts passing the list of files or list of directories (paths) asynchronously to an existing RAG framework that processes data. In some examples, this can be done by chunking, embedding, etc.

After operation 610, process flow 600 moves to operation 612.

Operation 612 depicts updating the state file to record a highest generation ID document loader processed from operation 610.

After operation 612, process flow 600 moves to 614, where process flow 600 ends.

Figure 7:
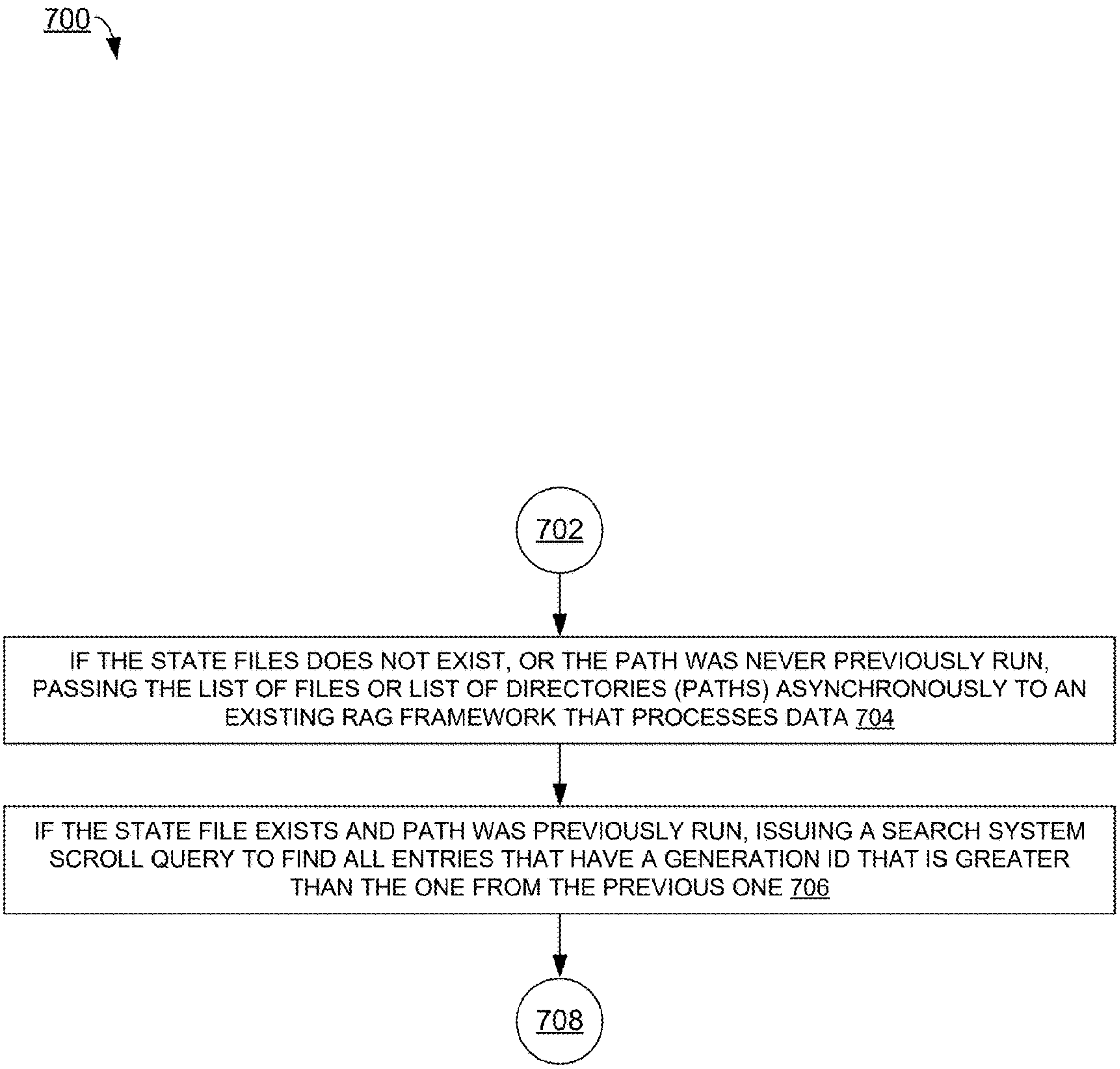
FIG. 7 illustrates another example process flow that can facilitate RAG ingestion versioning, in accordance with an embodiment of this disclosure.

FIG. 7 illustrates another example process flow 700 that can facilitate RAG ingestion versioning, in accordance with an embodiment of this disclosure. In some examples, one or more embodiments of process flow 700 can be implemented by system architecture 100 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of process flow 500 of FIG. 5, process flow 600 of FIG. 6, process flow 800 of FIG. 8, process flow 900 of FIG. 9, and/or process flow 1000 of FIG. 10.

In some examples, process flow 700 can be implemented as part of operation 606 of FIG. 6 to facilitate performing operations based on whether the provided path was previously run.

Process flow 700 begins with 702, and moves to operation 704.

Operation 704 depicts, if the state files does not exist, or the path was never previously run, passing the list of files or list of directories (paths) asynchronously to an existing RAG framework that processes data. This passing of the list of files can be similar to operation 610 of FIG. 6. That is, where it is not determined that there has been a previous iteration of ingesting data, and updated files since that iteration can be determined, then all files can be ingested during this iteration.

After operation 704, process flow 700 moves to operation 706.

Operation 706 depicts, if the state file exists and path was previously run, issuing a search system scroll query to find all entries that have a generation ID that is greater than the one from the previous one. This issuing of a search system scroll query can be similar to operation 608 of FIG. 6.

After operation 706, process flow 700 moves to 708, where process flow 700 ends.

Figure 8:
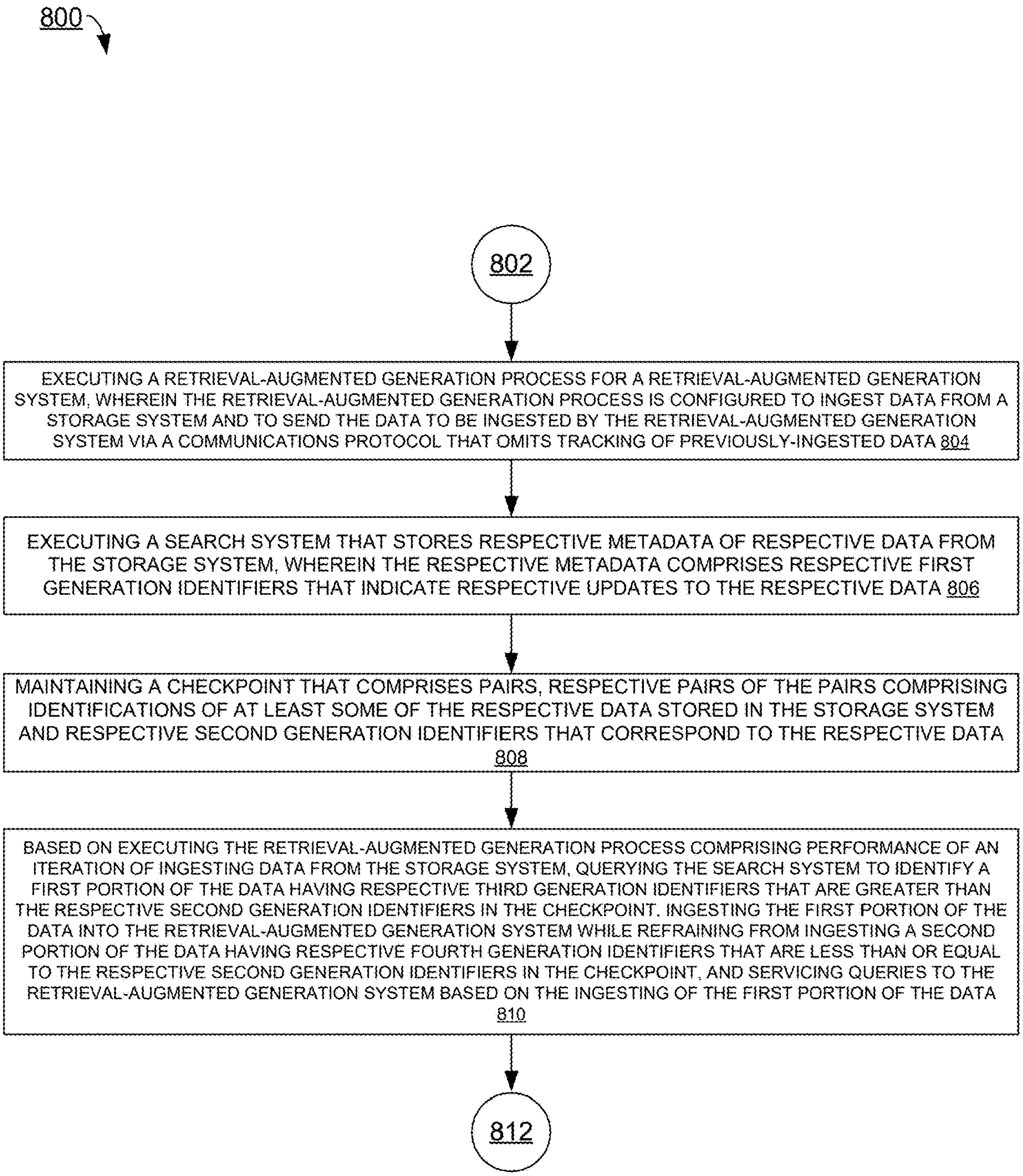
FIG. 8 illustrates another example process flow that can facilitate RAG ingestion versioning, in accordance with an embodiment of this disclosure.

FIG. 8 illustrates another example process flow 800 that can facilitate RAG ingestion versioning, in accordance with an embodiment of this disclosure. In some examples, one or more embodiments of process flow 800 can be implemented by system architecture 100 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of process flow 500 of FIG. 5, process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts executing a retrieval-augmented generation process for a retrieval-augmented generation system, wherein the retrieval-augmented generation process is configured to ingest data from a storage system and to send the data to be ingested by the retrieval-augmented generation system via a communications protocol that omits tracking of previously-ingested data. Using the example of FIG. 1, the retrieval-augmented generation process can be RAG framework 120, the retrieval-augmented generation system can be RAG application 114, and the storage system can be storage system 110.

In some examples, the retrieval-augmented generation system is a first retrieval-augmented generation system, and the retrieval-augmented generation process is configured to ingest the data from the storage system and to send the data to be ingested by a second retrieval-augmented generation system. That is, one RAG framework can ingest data for multiple different RAG applications.

After operation 804, process flow 800 moves to operation 806.

Operation 806 depicts executing a search system that stores respective metadata of respective data from the storage system, wherein the respective metadata comprises respective first generation identifiers that indicate respective updates to the respective data. Continuing with the example of FIG. 1, the search system can be search system 124, the metadata can be file metadata 125, and the data from the storage system can be files 112.

After operation 806, process flow 800 moves to operation 808.

Operation 808 depicts maintaining a checkpoint that comprises pairs, respective pairs of the pairs comprising identifications of at least some of the respective data stored in the storage system and respective second generation identifiers that correspond to the respective data. Continuing with the example of FIG. 1, the checkpoint can be state file 122.

After operation 808, process flow 800 moves to operation 810.

Operation 810 depicts, based on executing the retrieval-augmented generation process comprising performance of an iteration of ingesting data from the storage system, querying the search system to identify a first portion of the data having respective third generation identifiers that are greater than the respective second generation identifiers in the checkpoint, ingesting the first portion of the data into the retrieval-augmented generation system while refraining from ingesting a second portion of the data having respective fourth generation identifiers that are less than or equal to the respective second generation identifiers in the checkpoint, and servicing queries to the retrieval-augmented generation system based on the ingesting of the first portion of the data.

That is, during an ingest, a query to the search system can be made to determine a current version of files, and this can be compared against a version of files already ingested into the RAG application, as indicated by the state file. It can be that only new/updated files are then ingested.

In some examples, the performance of the iteration of the ingesting of the data from the storage system comprises updating the second generation identifiers in the checkpoint based on the third generation identifiers. That is, the state file can be updated with the current generation identifiers of ingested files at the end of performing an iteration of ingesting files.

In some examples, ingesting the first portion of the data into the retrieval-augmented generation system comprises creating chunks and embeddings from the first portion of the data, and ingesting the chunks and the embeddings into the retrieval-augmented generation system. That is, ingesting data can comprise creating chunks and embeddings of the data.

In some examples, a first file of the first portion of the data comprises an updated version relative to a second file ingested to the retrieval-augmented generation system previous to the performance of the iteration of the ingesting of the data from the storage system, the chunks are first chunks, the embeddings are first embeddings, and the ingesting of the first portion of the data into the retrieval-augmented generation system comprises removing second chunks that correspond to the second file, and second embeddings that correspond to the second file, from the retrieval-augmented generation system. That is, where an updated file is ingested into a RAG application, old chunks and embeddings from an old version of the file that was previously ingested can be deleted from the RAG application (e.g., from its chunk store, and vector database that stores embeddings).

In some examples, the servicing of the queries to the retrieval-augmented generation system is based on the ingesting of the first portion of the data, and is based on at least some data ingested prior to the performance of the iteration of the ingesting of the data from the storage system. That is, when a RAG application is updated with updated files, it can respond to queries using the updated data from the current iteration, as well as from data from previous iterations of ingesting data.

In some examples, the retrieval-augmented generation system is configured to interface with a large language model to respond to the queries based on the data from the storage system. That is, a RAG application and a LLM can be used together to respond to queries, where the RAG application provides information to the LLM that the LLM uses to respond.

After operation 810, process flow 800 moves to 812, where process flow 800 ends.

Figure 9:
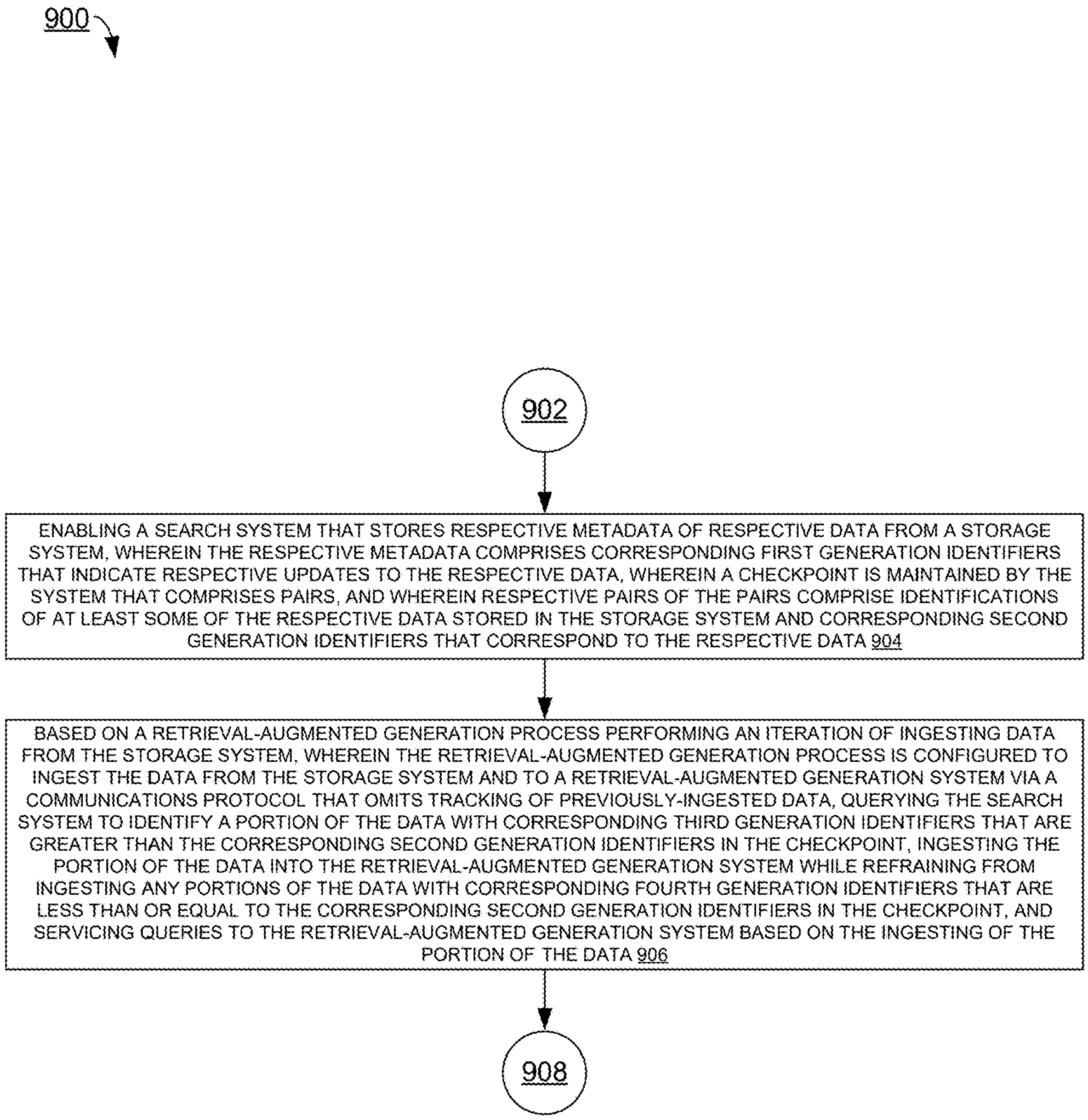
FIG. 9 illustrates another example process flow that can facilitate RAG ingestion versioning, in accordance with an embodiment of this disclosure.

FIG. 9 illustrates another example process flow 900 that can facilitate RAG ingestion versioning, in accordance with an embodiment of this disclosure. In some examples, one or more embodiments of process flow 900 can be implemented by system architecture 100 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of process flow 500 of FIG. 5, process flow 600 of FIG. 6, process flow 700 of FIG. 7, process flow 800 of FIG. 8 and/or process flow 1000 of FIG. 10.

Process flow 900 begins with 902, and moves to operation 904.

Operation 904 depicts enabling a search system that stores respective metadata of respective data from a storage system, wherein the respective metadata comprises corresponding first generation identifiers that indicate respective updates to the respective data, wherein a checkpoint is maintained by the system that comprises pairs, and wherein respective pairs of the pairs comprise identifications of at least some of the respective data stored in the storage system and corresponding second generation identifiers that correspond to the respective data. In some examples, operation 904 can be implemented in a similar manner as operations 806-808 of FIG. 8.

In some examples, the respective metadata is indexed for searching on the search system. In some examples, the metadata is first metadata, and second metadata of the storage system that corresponds to the first metadata lacks indexing for searching. That is, it can be that a search system is used because it indexes metadata from the storage system, where the storage system itself does not index that metadata, and the indexed metadata facilitates searching on the metadata (e.g., to determine updated files).

In some examples, the search system is configured to determine the respective metadata based on differencing data snapshots obtained from the storage system, via at least one application programming interface call. That is, metadata can be generated and ingested into the search system by using snapshots, and an API of change differences.

In some examples, the checkpoint stores data in a human-readable format. That is, the checkpoint can be in an extensible Markup Language (XML), or similar, format.

In some examples, the data comprises data objects, and the communications protocol comprises an object storage protocol. In some examples, the data comprises files, and the communications protocol comprises a network file storage protocol. That is, the present techniques can function with data stored as both objects (generally stored in a flat namespace) and files (generally stored in a hierarchy of directories).

After operation 904, process flow 900 moves to operation 906.

Operation 906 depicts, based on a retrieval-augmented generation process performing an iteration of ingesting data from the storage system, wherein the retrieval-augmented generation process is configured to ingest the data from the storage system and to a retrieval-augmented generation system via a communications protocol that omits tracking of previously-ingested data, querying the search system to identify a portion of the data with corresponding third generation identifiers that are greater than the corresponding second generation identifiers in the checkpoint, ingesting the portion of the data into the retrieval-augmented generation system while refraining from ingesting any portions of the data with corresponding fourth generation identifiers that are less than or equal to the corresponding second generation identifiers in the checkpoint, and servicing queries to the retrieval-augmented generation system based on the ingesting of the portion of the data. In some examples, operation 906 can be implemented in a similar manner as operation 810 of FIG. 8.

After operation 906, process flow 900 moves to 908, where process flow 900 ends.

Figure 10:
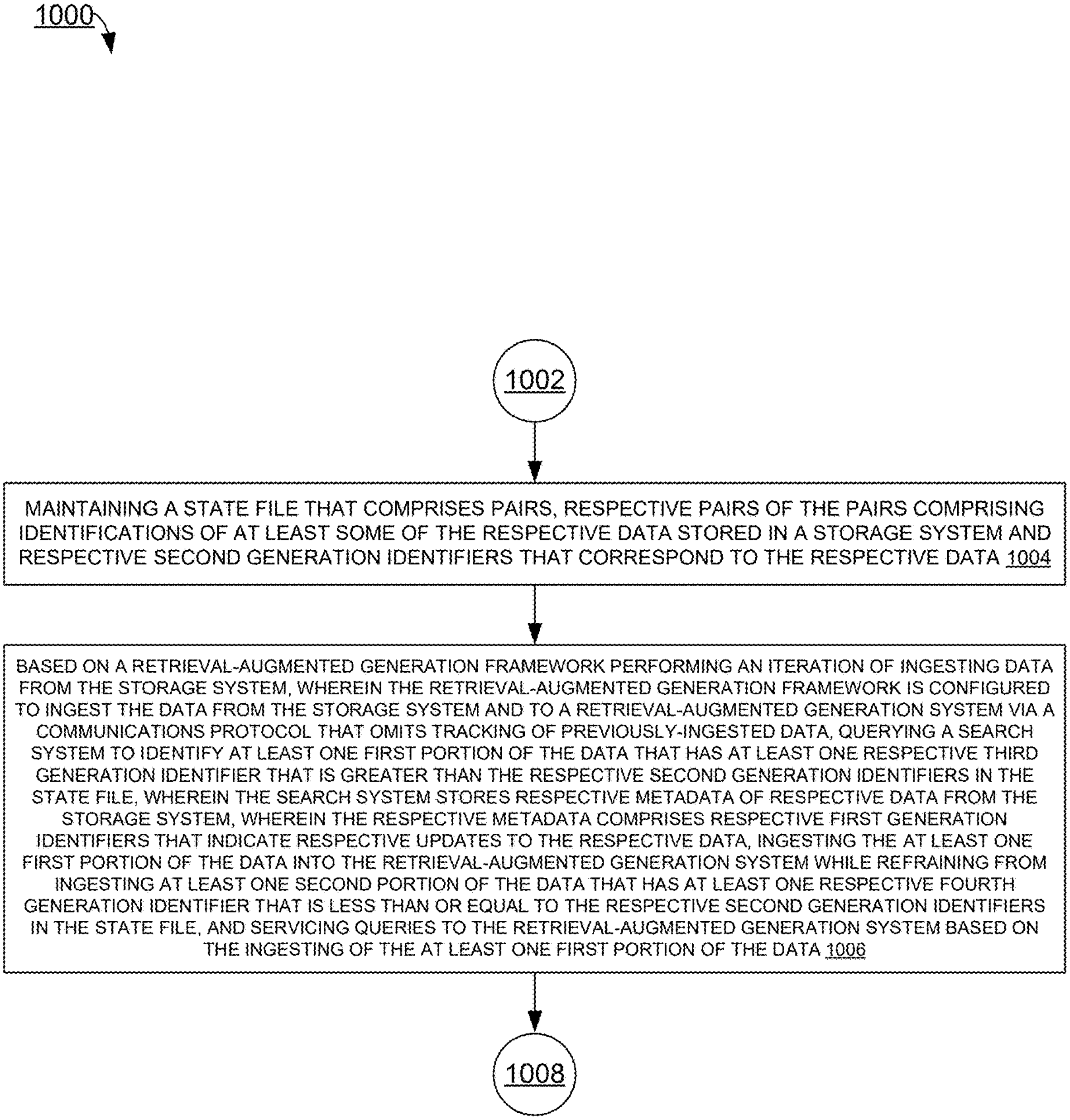
FIG. 10 illustrates another example process flow that can facilitate RAG ingestion versioning, in accordance with an embodiment of this disclosure.

FIG. 10 illustrates another example process flow 1000 that can facilitate RAG ingestion versioning, in accordance with an embodiment of this disclosure. In some examples, one or more embodiments of process flow 1000 can be implemented by system architecture 100 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of process flow 500 of FIG. 5, process flow 600 of FIG. 6, process flow 700 of FIG. 7, process flow 800 of FIG. 8 and/or process flow 900 of FIG. 9.

Process flow 1000 begins with 1002, and moves to operation 1004.

Operation 1004 depicts maintaining a state file that comprises pairs, respective pairs of the pairs comprising identifications of at least some of the respective data stored in a storage system and respective second generation identifiers that correspond to the respective data. In some examples, operation 1004 can be implemented in a similar manner as operations 808 of FIG. 8.

In some examples, the storage system is configured to send updates periodically about the data from the storage system to the search system. That is metadata updates at the search system can be initiated by the storage system.

After operation 1004, process flow 1000 moves to operation 1006.

Operation 1006 depicts, based on a retrieval-augmented generation framework performing an iteration of ingesting data from the storage system, wherein the retrieval-augmented generation framework is configured to ingest the data from the storage system and to a retrieval-augmented generation system via a communications protocol that omits tracking of previously-ingested data, querying a search system to identify at least one first portion of the data that has at least one respective third generation identifier that is greater than the respective second generation identifiers in the state file, wherein the search system stores respective metadata of respective data from the storage system, wherein the respective metadata comprises respective first generation identifiers that indicate respective updates to the respective data, ingesting the at least one first portion of the data into the retrieval-augmented generation system while refraining from ingesting at least one second portion of the data that has at least one respective fourth generation identifier that is less than or equal to the respective second generation identifiers in the state file, and servicing queries to the retrieval-augmented generation system based on the ingesting of the at least one first portion of the data. In some examples, operation 1006 can be implemented in a similar manner as operation 810 of FIG. 8.

In some examples, the storage system is configured to increment the respective first generation identifiers based on the respective updates to the respective data or based on creating a file of the respective data. That is, a generation ID for a file in its metadata can be incremented on its update and/or creation (where creating a file can comprise initializing a generation ID).

In some examples, the performing of the iteration of the ingesting of the data from the storage system is based on a hostname of the storage system, credentials to the storage system, and a path to the data on the storage system. That is, these parameters can be supplied to a component that performs ingesting data.

In some examples, the iteration of the ingesting of the data is a first iteration of the ingesting of first data, performing a second iteration of ingesting second data occurs prior to performing the first iteration of the ingesting of the first data, and performing the second iteration comprises, based on determining that the state file does not exist at a time at which performing the second iteration occurs, ingesting the second data without regard to the state file, and creating the state file. That is, where a state file does not exist when an iteration of ingesting is run (e.g., because data has not been ingested yet), all data can be ingested (because the RAG application does not yet have data).

In some examples, the iteration of the ingesting of the data is a first iteration of the ingesting of first data, performing a second iteration of ingesting second data occurs prior to performing the first iteration of the ingesting of the first data, and performing the second iteration comprises, based on determining that the second data has not previously been ingested at a time at which performing the second iteration occurs, ingesting the second data without regard to the state file. That is, where a path or file has not been previously ingested, the entire path or file can be ingested (without regard to updates).

After operation 1006, process flow 1000 moves to 1008, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of computer system 102 and/or remote computer 106 of FIG. 1.

In some examples, computing environment 1100 can implement one or more embodiments of the process flows of FIGS. 5-10 to facilitate RAG ingestion versioning.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 (containing disk 1122) can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1116 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

executing a retrieval-augmented generation process for a retrieval-augmented generation system, wherein the retrieval-augmented generation process ingests data from a storage system and to sends the data to be ingested by the retrieval-augmented generation system via a communications protocol that omits tracking of previously-ingested data;

executing a search system that stores respective metadata of respective data from the storage system, wherein the respective metadata comprises respective first generation identifiers, wherein the respective first generation identifiers indicate respective updates to the respective data, and wherein the search system omits metadata for the retrieval-augmented generation system;

maintaining a checkpoint that comprises pairs, respective pairs of the pairs comprising identifications of at least some of the respective data stored in the storage system and respective second generation identifiers that correspond to the respective data, wherein the respective second generation identifiers identify versions of data already ingested into the retrieval-augmented generation system; and based on executing the retrieval-augmented generation process comprising performance of an iteration of ingesting data into the retrieval-augmented generation system and from the storage system, querying the search system to identify a first portion of the data having respective third generation identifiers that are greater than the respective second generation identifiers in the checkpoint, wherein the search system increments, in the metadata, respective generation identifiers of respective data entities of the data based on the respective data entities being added or modified in the storage system, ingesting the first portion of the data into the retrieval-augmented generation system while refraining from ingesting a second portion of the data having respective fourth generation identifiers that are less than or equal to the respective second generation identifiers in the checkpoint, to produce ingested data, wherein the ingesting of the first portion of the data comprises overwriting a prior version of the first portion of the data in the retrieval-augmented generation system based on the first portion of the data having the respective third generation identifiers that are greater than the respective second generation identifiers in the checkpoint, wherein the respective third generation identifiers comprise respective third numerical values that are increased when corresponding third data is added or updated, and wherein the respective second generation identifiers comprise respective second numerical values that are increased when corresponding second data is added or updated, and servicing queries to the retrieval-augmented generation system based on the ingesting of the first portion of the data, wherein the retrieval-augmented generation system comprises a large language model, and wherein the retrieval-augmented generation system services the queries by providing at least part of the ingested data as a prompt to the large language model.

2. The system of claim 1, wherein the performance of the iteration of the ingesting of the data from the storage system comprises updating the second generation identifiers in the checkpoint based on the third generation identifiers.

3. The system of claim 1, wherein ingesting the first portion of the data into the retrieval-augmented generation system comprises:

creating chunks and embeddings from the first portion of the data; and ingesting the chunks and the embeddings into the retrieval-augmented generation system.

4. The system of claim 3, wherein a first file of the first portion of the data comprises an updated version relative to a second file ingested to the retrieval-augmented generation system previous to the performance of the iteration of the ingesting of the data from the storage system, wherein the chunks are first chunks, wherein the embeddings are first embeddings, and wherein the ingesting of the first portion of the data into the retrieval-augmented generation system comprises:

removing second chunks that correspond to the second file, and second embeddings that correspond to the second file, from the retrieval-augmented generation system.

5. The system of claim 1, wherein the servicing of the queries to the retrieval-augmented generation system is based on the ingesting of the first portion of the data, and is based on at least some data ingested prior to the performance of the iteration of the ingesting of the data from the storage system.

6. The system of claim 1, wherein the retrieval-augmented generation system is a first retrieval-augmented generation system, and wherein the retrieval-augmented generation process ingests the data from the storage system and to send the data to be ingested by a second retrieval-augmented generation system.

7. The system of claim 1, wherein the respective first generation identifiers identify respective versions of the respective data as stored on the storage system, wherein the respective second generation identifiers identify respective versions of the respective data that have been ingested into the retrieval-augmented generation system prior to the ingesting, wherein the respective third generation identifiers identify respective versions of the respective data as stored on the storage system that have not yet been ingested into the retrieval-augmented generation system, and wherein the respective fourth generation identifiers identify respective versions of the respective data as stored on the storage system that are not ingested as part of the ingesting because they have already been ingested.

8. A method, comprising:

enabling, by a system comprising at least one processor, a search system that stores respective metadata of respective data from a storage system, wherein the respective metadata comprises corresponding first generation identifiers that indicate respective updates to the respective data, wherein a checkpoint is maintained by the system that comprises pairs, and wherein respective pairs of the pairs comprise identifications of at least some of the respective data stored in the storage system and corresponding second generation identifiers that correspond to the respective data, wherein the search system omits metadata for the retrieval-augmented generation system, and wherein the respective second generation identifiers identify versions of data already ingested into the retrieval-augmented generation system; and based on a retrieval-augmented generation process performing an iteration of ingesting data into the retrieval-augmented generation system and from the storage system, wherein the retrieval-augmented generation process ingests the data from the storage system and to a retrieval-augmented generation system via a communications protocol that omits tracking of previously-ingested data, querying, by the system, the search system to identify a portion of the data with corresponding third generation identifiers that are greater than the corresponding second generation identifiers in the checkpoint, wherein the search system increments, in the metadata, respective generation identifiers of respective data entities of the data based on the respective data entities being added or modified in the storage system, ingesting, by the system, the portion of the data into the retrieval-augmented generation system while refraining from ingesting any portions of the data with corresponding fourth generation identifiers that are less than or equal to the corresponding second generation identifiers in the checkpoint, to produce ingested data, wherein the ingesting of the portion of the data comprises overwriting a prior version of the portion of the data in the retrieval-augmented generation system based on the portion of the data having the respective third generation identifiers that are greater than the respective second generation identifiers in the checkpoint, wherein the respective third generation identifiers comprise respective third numerical values that are increased when corresponding third data is added or updated, and wherein the respective second generation identifiers comprise respective second numerical values that are increased when corresponding second data is added or updated, and servicing, by the system, queries to the retrieval-augmented generation system based on the ingesting of the portion of the data, wherein the retrieval-augmented generation system comprises a large language model, and wherein the retrieval-augmented generation system services the queries by providing at least part of the ingested data as a prompt to the large language model.

9. The method of claim 8, wherein the respective metadata is indexed for searching on the search system.

10. The method of claim 9, wherein the metadata is first metadata, and wherein second metadata of the storage system that corresponds to the first metadata lacks indexing for searching.

11. The method of claim 8, wherein the search system determines the respective metadata based on differencing data snapshots obtained from the storage system, via at least one application programming interface call.

12. The method of claim 8, wherein the checkpoint stores data in a human-readable format.

13. The method of claim 8, wherein the data comprises data objects, and wherein the communications protocol comprises an object storage protocol.

14. The method of claim 8, wherein the data comprises files, and wherein the communications protocol comprises a network file storage protocol.

15. A non-transitory computer-readable medium comprising instructions that, in response to execution, cause a system comprising at least one processor to perform operations, comprising:

maintaining a state file that comprises pairs, respective pairs of the pairs comprising identifications of at least some of the respective data stored in a storage system and respective second generation identifiers that correspond to the respective data, wherein the respective second generation identifiers identify versions of data already ingested into the retrieval-augmented generation system; and based on a retrieval-augmented generation framework performing an iteration of ingesting data into the retrieval-augmented generation system and from the storage system, wherein the retrieval-augmented generation framework ingests the data from the storage system and to a retrieval-augmented generation system via a communications protocol that omits tracking of previously-ingested data, querying a search system to identify at least one first portion of the data that has at least one respective third generation identifier that is greater than the respective second generation identifiers in the state file, wherein the search system stores respective metadata of respective data from the storage system, wherein the respective metadata comprises respective first generation identifiers that indicate respective updates to the respective data, wherein the search system increments, in the metadata, respective generation identifiers of respective data entities of the data based on the respective data entities being added or modified in the storage system, ingesting the at least one first portion of the data into the retrieval-augmented generation system while refraining from ingesting at least one second portion of the data that has at least one respective fourth generation identifier that is less than or equal to the respective second generation identifiers in the state file, to produce ingested data, wherein the ingesting of the at least one first portion of the data comprises overwriting a prior version of the at least one first portion of the data in the retrieval-augmented generation system based on the at least one first portion of the data having the at least one respective third generation identifier that is greater than the respective second generation identifiers, wherein the respective third generation identifiers comprise respective third numerical values that are increased when corresponding third data is added or updated, and wherein the respective second generation identifiers comprise respective second numerical values that are increased when corresponding second data is added or updated, and servicing queries to the retrieval-augmented generation system based on the ingesting of the at least one first portion of the data, wherein the retrieval-augmented generation system comprises a large language model, and wherein the retrieval-augmented generation system services the queries by providing at least part of the ingested data as a prompt to the large language model.

16. The non-transitory computer-readable medium of claim 15, wherein the storage system sends updates periodically about the data from the storage system to the search system.

17. The non-transitory computer-readable medium of claim 15, wherein the storage system increments the respective first generation identifiers based on the respective updates to the respective data or based on creating a file of the respective data.

18. The non-transitory computer-readable medium of claim 15, wherein the performing of the iteration of the ingesting of the data from the storage system is based on a hostname of the storage system, credentials to the storage system, and a path to the data on the storage system.

19. The non-transitory computer-readable medium of claim 15, the iteration of the ingesting of the data is a first iteration of the ingesting of first data, wherein performing a second iteration of ingesting second data occurs prior to performing the first iteration of the ingesting of the first data, and wherein performing the second iteration comprises:

based on determining that the state file does not exist at a time at which performing the second iteration occurs, ingesting the second data without regard to the state file, and creating the state file.

20. The non-transitory computer-readable medium of claim 15, the iteration of the ingesting of the data is a first iteration of the ingesting of first data, wherein performing a second iteration of ingesting second data occurs prior to performing the first iteration of the ingesting of the first data, and wherein performing the second iteration comprises:

based on determining that the second data has not previously been ingested at a time at which performing the second iteration occurs, ingesting the second data without regard to the state file.

* * * * *